United States Patent
Stoyanov

(10) Patent No.: US 11,383,171 B1
(45) Date of Patent: Jul. 12, 2022

(54) SYSTEMS AND METHODS FOR PROVIDING A USER INTERFACE THAT SUPPORTS LISTING A UNIQUE DIGITAL ARTICLE IN MULTIPLE CURRENCIES

(71) Applicant: Mythical, Inc., Sherman Oaks, CA (US)

(72) Inventor: Stoyan Nikodimov Stoyanov, San Rafael, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/510,931

(22) Filed: Oct. 26, 2021

Related U.S. Application Data

(60) Provisional application No. 63/216,919, filed on Jun. 30, 2021.

(51) Int. Cl.
| | | |
|---|---|---|
| *A63F 13/792* | (2014.01) | |
| *A63F 13/533* | (2014.01) | |
| *G06Q 10/08* | (2012.01) | |
| *G06Q 20/22* | (2012.01) | |
| *G06Q 20/38* | (2012.01) | |
| *G06Q 20/12* | (2012.01) | |

(52) U.S. Cl.
CPC .......... *A63F 13/792* (2014.09); *A63F 13/533* (2014.09); *G06Q 10/087* (2013.01); *G06Q 20/123* (2013.01); *G06Q 20/227* (2013.01); *G06Q 20/381* (2013.01); *A63F 2300/308* (2013.01); *A63F 2300/5513* (2013.01); *A63F 2300/575* (2013.01)

(58) Field of Classification Search
CPC ................................................ A63F 2300/575
See application file for complete search history.

(56) References Cited

U.S. PATENT DOCUMENTS

| | | | |
|---|---|---|---|
| 8,052,520 B2 * | 11/2011 | Park | G06Q 10/087 463/25 |
| 10,946,291 B1 | 3/2021 | Harris | |
| 11,062,284 B1 | 7/2021 | Cunningham | |
| 2004/0266505 A1 * | 12/2004 | Keam | A63F 13/79 463/1 |

(Continued)

OTHER PUBLICATIONS

Wowpedia, "Auction House" published Feb. 22, 2020, available at https://wowpedia.fandom.com/wiki/Auction_House?oldid=5624964. (Year: 2020).*

(Continued)

*Primary Examiner* — Jay Trent Liddle
(74) *Attorney, Agent, or Firm* — Esplin & Associates, PC

(57) ABSTRACT

Systems and methods to provide user interfaces to players of an online gaming platform are disclosed. Exemplary implementations may manage player accounts associated with players, including a first player account that includes a first unique digital article associated with a first in-game player-controllable character configured to be used in an instance of a game; present a user interface that enables a first player to enter and/or select different prices in different currencies; and effectuate publication of a listing information for the first unique digital article. A second player may select from different settlement options. The first unique digital article may be transferred from the first player to the second player.

16 Claims, 7 Drawing Sheets

(56) References Cited

U.S. PATENT DOCUMENTS

| | | | |
|---|---|---|---|
| 2007/0087831 A1 | 4/2007 | Van Luchene | |
| 2008/0220876 A1* | 9/2008 | Mehta | A63F 13/85 |
| | | | 463/42 |
| 2012/0015726 A1* | 1/2012 | Busey | A63F 13/58 |
| | | | 463/31 |
| 2015/0170112 A1 | 6/2015 | Decastro | |
| 2016/0292680 A1 | 10/2016 | Wilson, Jr. | |
| 2018/0114403 A1 | 4/2018 | Jayachandran | |
| 2018/0204260 A1 | 7/2018 | Mcgregor | |
| 2019/0005595 A1 | 1/2019 | Tautenhan | |
| 2019/0205873 A1 | 7/2019 | Kamalsky | |
| 2019/0236605 A1 | 8/2019 | Mchale et al. | |
| 2019/0282906 A1 | 9/2019 | Yong | |
| 2019/0295371 A1 | 9/2019 | Simons | |
| 2019/0299105 A1* | 10/2019 | Knight | G07F 17/3244 |
| 2019/0340623 A1 | 11/2019 | Rivkind | |
| 2019/0354945 A1 | 11/2019 | Mahajan | |
| 2020/0013048 A1 | 1/2020 | Love | |
| 2020/0097927 A1 | 3/2020 | Groarke | |
| 2020/0202668 A1 | 6/2020 | Cotta | |
| 2020/0211092 A1 | 7/2020 | Sarin | |
| 2020/0273048 A1* | 8/2020 | Andon | G06F 16/2379 |
| 2020/0320623 A1 | 10/2020 | Mcgrath | |
| 2020/0360815 A1* | 11/2020 | Eatedali | A63F 13/798 |
| 2021/0073881 A1* | 3/2021 | Stoddard | G06Q 30/0641 |
| 2021/0129028 A1* | 5/2021 | Eatedali | A63F 13/35 |
| 2021/0342831 A1* | 11/2021 | Jeong | G06Q 20/20 |

OTHER PUBLICATIONS

"Wowhead's Guide on How to Play World of Warcraft," published Aug. 29, 2018, available at https://web.archive.org/web/20190201051143/https://www.wowhead.com/how-to-play-world-of-warcraft. (Year: 2018).*

Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https:// search.proquest.com/wire-feeds/game-x-coin-launches-first-blockchain-platform.

Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https://search.proquest.com/wire-feeds/game-x-coin-launches-first-blockchain-platform/docview20/81459699/se-2?accountid=14753 (Year: 2018) (2 pages).

Siira, Erkki, et al. Designing and Implementing Common Market for Cross-Game Purchases between Mobile Games. Bled eConference. 2017. pp. 1-16.

* cited by examiner

SYSTEMS AND METHODS FOR PROVIDING A USER INTERFACE THAT SUPPORTS LISTING A UNIQUE DIGITAL ARTICLE IN MULTIPLE CURRENCIES

FIELD OF THE DISCLOSURE

The present disclosure relates to systems and methods for providing a user interface for listing a unique digital article in multiple currencies, the unique digital article being correlated to a player-controllable in-game virtual character that is usable within an instance of a game within an online gaming platform.

BACKGROUND

Online gaming platforms are known. Distributed registries are known techniques to produce a secure record of ownership of goods, transactions, and other information. For example, a blockchain is a distributed registry. Different types of distributed registries are known.

SUMMARY

One aspect of the present disclosure relates to a system configured to provide user interfaces to players of an online gaming platform. The online gaming platform may be configured to execute an instance of a game to facilitate presentation of the game to the players. The presentation of the game may be based on views of the game that are determined during execution of the instance of the game. The players may include a first player, a second player, and/or other players. The system may include one or more processors configured by machine-readable instructions. The one or more processors may be configured to manage player accounts associated with the players. The player accounts may include a first player account associated with the first player. The first player account may include a first account inventory of one or more virtual items. The first player may control the one or more virtual items in the first account inventory. The first account inventory may include a first unique digital article that is associated with a first in-game player-controllable character configured to be used in the instance of the game. The one or more processors may be configured to facilitate presentation of a first user interface to the first player. The first user interface may be configured to receive player input from the first player. The first user interface may enable, through the player input, the player to (i) enter and/or select the first unique digital article that is included in the first account inventory, (ii) enter and/or select a first price listed in a first currency, (iii) enter a second price listed in a second currency different from the first currency, and (iv) initiate transmission of listing information for publication to other players including the second player. The listing information may correspond to the player input received from the first player through the first user interface. The listing information may present the first unique digital article for sale at either the first price or the second price. The one or more processors may be configured to receive the transmission of the listing information. The one or more processors may be configured, responsive to receipt of the transmission of the listing information, to effectuate the publication of the listing information to the other players including the second player. The publication may be presented to the other players in a second interface.

Another aspect of the present disclosure related to a method of providing user interfaces to players of an online gaming platform, wherein the online gaming platform executes an instance of a game to facilitate presentation of the game to the players, wherein the presentation of the game is based on views of the game that are determined during execution of the instance of the game, wherein the players include a first player and a second player. The method may include managing player accounts associated with the players. The player accounts may include a first player account associated with the first player. The first player account may include a first account inventory of one or more virtual items. The first player controls the one or more virtual items in the first account inventory. The first account inventory may include a first unique digital article that is associated with a first in-game player-controllable character configured to be used in the instance of the game. The method may include facilitating presentation of a first user interface to the first player. The first user interface is configured to receive player input from the first player. The first user interface enables, through the player input, the player to (i) enter and/or select the first unique digital article that is included in the first account inventory, (ii) enter and/or select a first price listed in a first currency, (iii) enter a second price listed in a second currency different from the first currency, and (iv) initiate transmission of a listing information for publication to other players including the second player. The listing information corresponds to the player input received from the first player through the first user interface. The listing information presents the first unique digital article for sale at either the first price or the second price. The method may include receiving the transmission of the listing information. The method may include receiving to receiving the transmission of the listing information, effectuating the publication of the listing information to the other players including the second player. The publication is presented to the other players in a second interface. In some implementations, the method may include receiving second player input, from the second player, through the second interface. The second player input may include a selection of either the first price or the second price. The method may include facilitating presentation of a third interface to the second player. Responsive to the selection of the first price through the second interface, the third interface may present a first set of one or more settlement options to the second player. The first set may include the first currency. Responsive to the selection of the second price through the second interface, the third interface may present a second set of one or more settlement options to the second player. The second set may include the second currency. The method may include receiving third player input, from the second player, through the settlement interface. The third player input represents a settlement option selected from either the first or second set of settlement options. The method may include transferring the first unique digital article from the first player to the second player, in accordance with the selected settlement option.

As used herein, any association (or relation, or reflection, or indication, or correspondency) involving servers, processors, client computing platforms, players, player accounts, inventories, assets, populations, requests, manners of usage, exchanges, challenges, offers, transactions, in-game actions, rights, benefits, ownership, permanent registries, responses, denials, contracts, metrics, metric values, scores, gains, trigger events, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
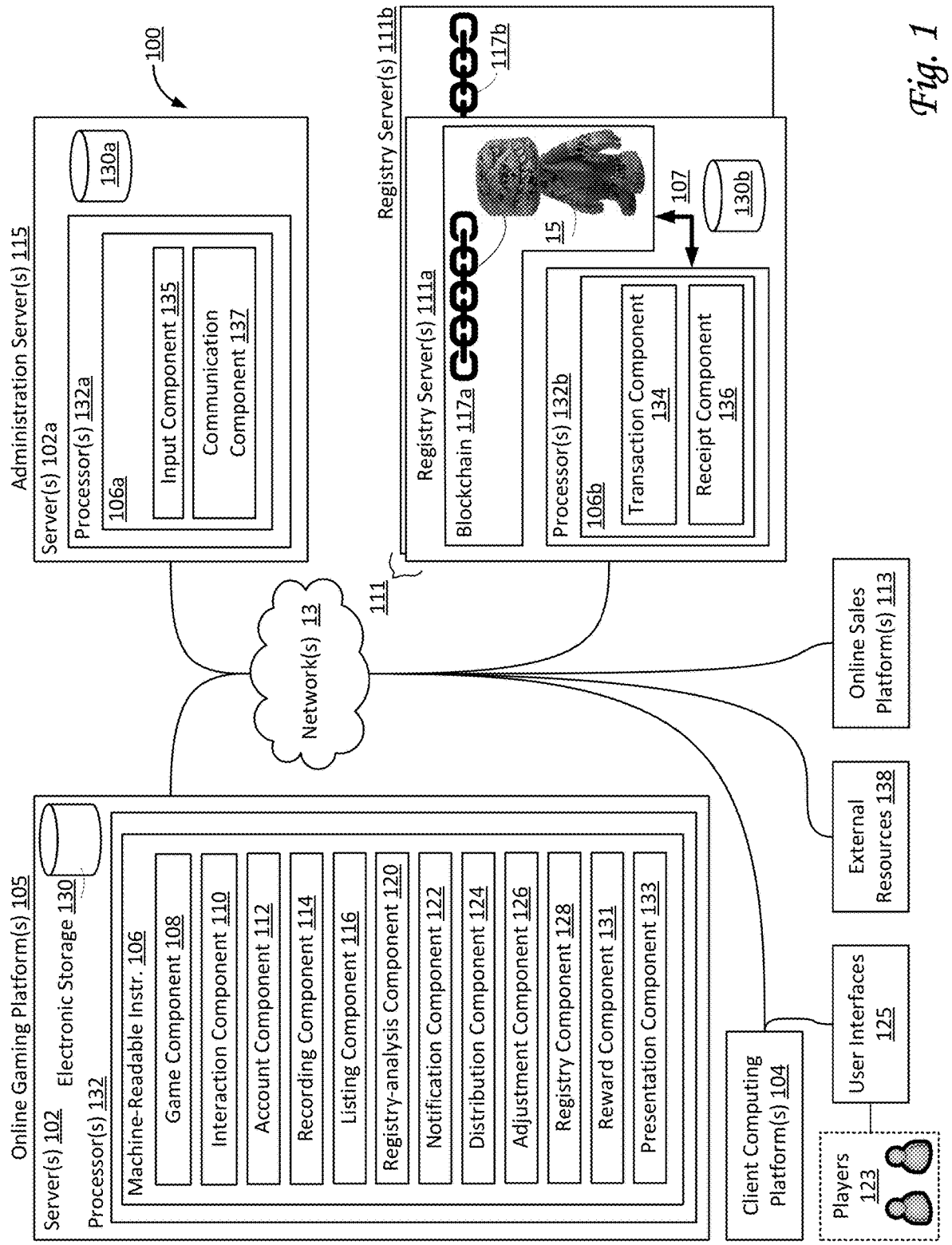
FIG. 1 illustrates a system configured to provide user interfaces to players of an online gaming platform, in accordance with one or more implementations.

FIG. 1 illustrates a system 100 configured to provide user interfaces to players 123 of an online gaming platform 105, in accordance with one or more implementations. Online gaming platform 105 may be configured to execute an instance of a game to facilitate presentation of the game to players 123. The presentation of the game may be based on views of the game that are determined during execution of the instance of the game. For example, players 123 may include a first player, a second player, and/or other players. System 100 may be configured to manage player accounts associated with players 123. The player accounts may include a first player account associated with the first player, a second player account associated with a second player, and so forth. The first player account may include a first account inventory of one or more virtual items. The second player account may include a second account inventory of one or more virtual items, and so forth. The first player may control the one or more virtual items in the first account inventory. The second player may control the one or more virtual items in the second account inventory, and so forth. An individual account inventory may include an individual unique digital article that is associated with an individual in-game player-controllable character configured to be used in an instance of a game. Players 123 may exchange unique digital articles with other players. As used herein, exchanges may refer to individual players winning, losing, auctioning, selling, purchasing, trading, bartering, wagering, staking, and/or otherwise exchanging digital resources (directly, without a store or store interface under control of online gaming platform 105) to other individual players or with other individual players. In some implementations, players may be referred to as users.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number or other numerical identifier of the digital article, and/or other types of information. As used herein, ownership of unique digital articles may be tracked, recorded, and/or otherwise registered on one or more permanent registries. As such, a unique digital article may be a registry-tracked unique digital article.

Individual unique digital articles may be associated and/or correlated with another entity (which may be referred to as a "correlated entity") by virtue of technology provided and/or supported by the one or more permanent registries on which the ownership of the individual unique digital articles is tracked (including but not limited to smart contracts and/or other executable code on the one or more permanent registries). Accordingly, ownership of a unique digital article may correlate to the provision of one or more rights with respect to the correlated entity (e.g., control and/or other rights). Transactions involving a unique digital article recorded on a permanent registry may correlate to certain transactions (or modifications) of the correlated entity, and/or vice versa.

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, permissions, etc. The use of the singular "entity" or "correlated entity" is not intended to be limiting, as multiple different objects, items, rights, memberships, permissions, etc. may be correlated to a single unique digital article. By way of non-limiting example, a correlated entity may be an art work, a ticket to an event, a subscription to certain media content, a bundle of rights related to captured audio and/or video information, rights to distribution gains, and so forth. As used herein, the term "non-fungible token" or "NFT" may be used to refer to a combination of a particular unique digital article and a particular correlated entity that is correlated to the particular unique digital article.

System 100 may include one or more online gaming platforms 105, registry server(s) 111, administration servers 115, one or more client computing platform(s) 104, user interfaces 125, servers 102, one or more online sales platforms 113, one or more external resources 138, and/or other components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123. Electronic storage 130a and electronic storage 130b may be similar to electronic storage 130 as described elsewhere in this disclosure, though included in administration servers 115 and registry servers 111, respectively, as depicted in FIG. 1.

Instances of games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital resources (e.g., characters, weapons, virtual items, etc.) to players 123 of online gaming platform 105.

Referring to the game and to online gaming platform 105, in some implementations, individual players may own individual (in-game) virtual items, and exchange these items with (or to) other individual players. Due to an exchange, ownership rights of a virtual item may transition from an original owner to a new owner (even if there may, in some implementations, be one or more intermediary and/or temporary owners during the process of performing the exchange). In some implementations, digital resources may be associated with other rights than ownership rights, such as, by way of non-limiting example, distribution rights.

In some implementations, distribution rights of digital resources may reflect rights held by the individual ones of the players to receive certain distributions of benefits upon exchanges involving particular digital resources. That is, the individual players may own/hold rights to particular digital resources that guarantee them benefits upon (future) exchanges involving those digital resources regardless of whether the individual players owns/hold the ownership rights for those digital resources. In some implementations, the distribution gains may result from a particular action or activity (such as, e.g., a sale of a particular digital resource), e.g., within the online gaming platform 105, of a particular digital resource. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital resources.

In some implementations, the digital resources may include virtual items that are not fungible and that may be usable within an online gaming platform 105. In some implementations, the digital resources may represent (three-dimensional) in-game player-controllable characters that can interact with other (in-game) virtual items within online gaming platform 105. By way of non-limiting example, digital resources may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership (including exchanging virtual items and/or other assets through challenges). As used herein, a digital resource is fungible if it is functionally and/or physically indistinguishable from another digital resource. For example, a payment token such as a Bitcoin is a fungible digital resource. A digital resource may be non-fungible if it is unique, or one-of-a-kind. For example, a specific individual CryptoKitty™ may be a non-fungible digital resource. A digital resource may be semi-fungible if there is a set of a limited number of similar but distinguishable digital resources. For example, a limited-edition Blanko™ or another in-game character may be a semi-fungible digital resource. For example, one of a limited number of 2-dimensional or 3-dimensional in-game virtual items may be a semi-fungible digital resource. For example, a digital ticket to a show, concert, exhibition, and/or other event may be a semi-fungible digital resource. For example, a piece of art or jewelry (e.g., as a virtual item or as representing a physical item) may be a semi-fungible digital resource. As used herein, semi-fungible digital resources are considered as "not fungible" or non-fungible digital resources. In some implementations, digital resources may be usable within one or more games.

Registry server(s) 111 (e.g., registry server 111a, registry server 111b, and so forth) may be used to implement one or more permanent registries, including but not limited to blockchain 117a, blockchain 117b (partially visible in FIG. 1), and so forth. In some implementations, registries may be referred to as ledgers. In some implementations, permanent registries may be referred to as decentralized and/or immutable registries. In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. The smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the permanent registries implemented by registry servers 111 is a private permissioned permanent registry. A permanent registry may be configured to record information. The recorded information may pertain to unique digital articles that are associated with in-game player-controllable characters that are configured to be used in the instance of the game. The recorded information may include ownership of the unique digital articles. Implementing the in-game actions in the instance of the game may include, for at least some of the in-game actions implemented in the instance of the game, effectuating modifications to the recorded information pertaining to the unique digital article. For example, ownership rights and/or other rights may be modified. In some implementations, a unique digital article may be removed from one permanent registry and added or recorded on another permanent registry. In some implementations, at least one of the permanent registries implemented by registry servers 111 is a public decentralized ledger. For example, the public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of blockchain 117a or another permanent registry may be grouped together in units that are referred to as blocks. For example, an individual block may include one or more assets (or resources) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

As depicted in FIG. 1, registry server(s) 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of transaction component 134, receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be associated with a player-controllable in-game character, as depicted, and unique digital article 15 may have been recorded on blockchain 117a, as depicted). Registry server(s) 111b may include similar components as registry server(s) 111a, including but not limited to blockchain 117b and/or other components.

In some implementations, one or more permanent registries implemented by registry servers 111 may be publicly accessible. In some implementations, one or more permanent registries implemented by registry servers 111 may be private and/or permissioned. In some implementations, one or more permanent registries implemented by registry servers 111 may be append-only. In some implementations, one or more permanent registries implemented by registry servers 111 may be decentralized and/or distributed. In some implementations, existing blocks of one or more permanent registries implemented by registry servers 111 can substantially not be altered or deleted, unless multiple copies are altered. This is unlikely to happen provided that the multiple copies stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication, as well as non-repudiation.

As described herein, the utility or usage of a unique digital article may be different for or on different permanent registries. The administration for a set or population of unique digital articles may be different for or on different permanent registries, hence the term "blockchain-specific". For example, the same unique digital article may have a first utility while recorded on a first blockchain, but not while recorded on a second blockchain. Conversely, the same unique digital article may have a second utility while recorded on the second blockchain, but not while recorded on first blockchain. For example, the administration of a set or population of unique digital articles may be blockchain-specific, or based on how many unique digital articles are recorded of the first blockchain versus the second blockchain.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, one or more online sales platforms 113, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, an account component 112, a recording component 114, a listing component 116, a registry-analysis component 120, a notification component 122, a distribution component 124, an adjustment component 126, a registry component 128, a reward component 131, a presentation component 133, a transaction component 134, a receipt component 136, an input component 135, a communication component 137, and/or other instruction components. Processor(s) 132a and processor(s) 132b may be similar to processor(s) 132 as described elsewhere in this disclosure, though included administration servers 115 and registry servers 111, respectively, as depicted in FIG. 1. Machine-readable instructions 106a and machine-readable instructions 106b may be similar to machine-readable instructions 106 as described elsewhere in this disclosure, though included in administration servers 115 and registry servers 111, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to action requests for the in-game actions by the players. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views of the game that are determined during execution of the game, e.g., as based on instructions and/or other input from players. In some implementations, the view may be communicated (e.g., by streaming, via object/position data, and/or other information) from online gaming platform 105, registry server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a player.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The player characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controlled characters. Player-controlled element(s) may move through and interact with the virtual space (e.g., non-player characters in the virtual space, other objects in the virtual space, etc.). In some implementations, player-controlled characters may be capable of locomotion within the topography of the simulated space that is included in the instance of the game. In some implementations, player-controlled elements controlled by and/or associated with a given player may be created and/or customized by the given player. Individual players 123 may have or control an "inventory" of virtual goods and currency (e.g., resources of the plurality of resource types) that the individual player can use (e.g., by manipulation of a player character and/or other player-controlled elements) and/or other items, to perform in-game actions within the virtual space. Players may control digital resources (e.g., characters) in a game hosted by online gaming platform 105. In some implementations, account inventories may be managed (at least in part) using blockchain 117a. For example, ownership rights (and/or other types of rights) of individual virtual items included in an individual account inventory may be recorded on blockchain 117a. In some implementations, individual account inventories may correspond to individual smart contracts stored on blockchain 117a.

Interaction component 110 may be configured to enable, facilitate, and/or implement in-game actions by players 123 in instances of games. In some implementations, interaction component 110 may be configured to operate in response to instructions and/or action requests by players 123. For example, one or more players may interact within online gaming platform 105 to build, create, gather, find, combine, and/or otherwise generate content (i.e., player-generated content). In some implementations, operations may be accomplished by interaction component 110 through user interfaces 125. In particular, operations pertaining to a particular player may be accomplished through a particular user interface 125 of a particular client computing platform 104, where the particular client computing platform 104 is associated with the particular player. In other words, the particular player may interact with an instance of a game through interaction component 110 and/or the particular user interface 125. For example, interaction component 110 may be configured to receive indications of acceptance from players, through associated client computing platforms 104 (or, e.g., a particular user interface 125 of a particular client computing platform 104). For example, an acceptance may accept a particular offer to partake in an activity or agreement. In some implementations, interaction component 110 may be configured to receive indications of agreements from players, through associated client computing platforms 104 (or, e.g., a particular user interface 125 of a particular client computing platform 104).

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual user interface may be player-specific and/or specific to a particular client computing platform. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items, the second player account may include a second account inventory of one or more virtual items, and so forth. Individual players may control one or more virtual items in their individual account inventories. In some implementations, an individual account inventory may include an individual unique digital article. The individual unique digital article may be associated with an individual in-game player-controllable character configured to be used (e.g., played with) in the instance of the game.

Recording component 114 is configured to record assets (including unique digital articles) on permanent registries. In some implementations, recording component 114 may record ownership of assets. In some implementations, recording component 114 may be configured to receive requests to perform a recordation. For example, recording component 114 may receive, on behalf of an individual player, a recordation request to record ownership of an individual unique digital article on a permanent registry (such as, e.g., blockchain 117a). In some implementations, recording component 114 may receive such requests from online gaming platform 105 and/or other components of system 100. For example, a particular request to record a particular unique digital article may correspond to the issuance and/or creation of that particular unique digital article. When a unique digital article or other digital resource that is not fungible is issued and/or created, recording component 114 may record its ownership on a particular permanent registry.

Presentation component 133 may be configured to present interfaces (e.g., user interfaces 125) to players, e.g., through client computing platforms 104 associated with the respective players. In some implementations, presentation component 133 may be configured to effectuate presentations of interfaces to players. The presented interfaces may be player-specific. For example, presentation component 133 may facilitate presentation of an individual user interface 125 to an individual player. Individual user interface 125 may be configured to receive player input from the individual player. In some implementations, individual user interface 125 may enable the individual player to perform some or all of the following: enter and/or select a particular unique digital article (e.g., from the account inventory associated with the individual player), enter and/or select a first price (listed) in a first currency, enter and/or select a second price (listed) in a second currency, enter and/or select a duration for this particular listing, initiate transmission and/or publication of listing information, and/or other tasks. For example, the first currency may be a fiat currency, such as US dollar, Euro, Japanese yen, etc. For example, the second currency may be different from the first currency. In some implementations, the second currency may be a decentralized currency, such as Bitcoin, Ether, Ripple (XRP), etc. The listing information (of this particular listing) may correspond to the player input received from the individual player. Publication of the listing information may present the particular unique digital article for sale at either the first price or the second price. In some implementations, one or both of the first price and the second price are (manually) entered by the individual player. The first price and second price do not have to be linked and/or otherwise connected by any particular or official exchange rate. Instead, for example, the individual player may decide to list the particular unique digital article for $150 US dollar and for 0.1 Ether (by entering both amounts individually and separately in individual user interface 125). For the duration of this listing, unless modified by the individual player, a buyer can either buy the particular unique digital article for $150, or buy the particular unique digital article for 0.1 Ether, without regard for the current exchange rate, or fluctuations in the exchange rate.

In some implementations, presentations by presentation component 133 may be performed jointly (or at least in some cooperative manner) with one or both of game component 108 and/or interaction component 110. Presentation component 133 may present offers (from other players) to particular players, as described elsewhere in this disclosure.

Figure 3:
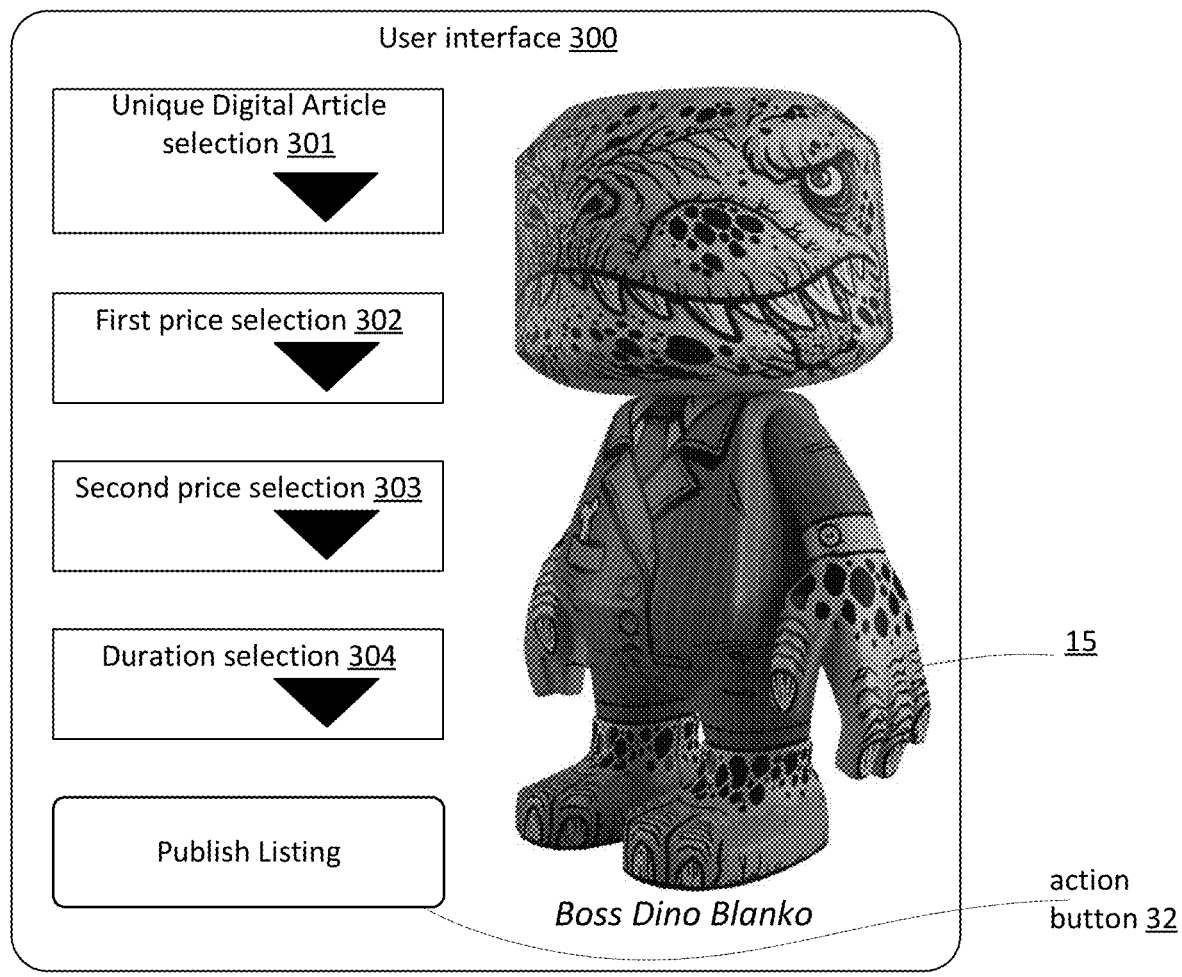
FIGS. 3-4 illustrate example implementations of user interfaces, as may be used by a system configured to provide user interfaces to players of an online gaming platform, in accordance with one or more implementations.

FIG. 3 illustrates an example implementation of a user interface 300 as may be used by system 100, in accordance with one or more implementations. User interface 300 may enable a particular player to provide input to present a unique digital article for sale. User interface 300 may include sections or fields for unique digital article selection 301, first price selection 302, second price selection 303, duration selection 304, and/or other graphical user interface elements. Unique digital article selection 301 may enable the particular player to enter and/or select one or more unique digital articles (e.g., through one or more text fields or one or more dropdown menus), one or more types of unique digital articles, and/or one or more filters to choose a subset of unique digital articles. Here, as depicted, the particular user has selected unique digital article 15 labeled "Boss Dino Blanko". First price selection 302 may enable the particular player to enter and/or select a first price (e.g., through one or more text fields or one or more dropdown menus, e.g., in a fiat currency). For example, the particular player could enter a first price of $150 US dollar here (not depicted). Second price selection 303 may enable the particular player to enter and/or select a second price (e.g., through one or more text fields or one or more dropdown menus, e.g., in a decentralized currency). For example, the particular player could enter a second price of 0.1 Ether here (not depicted). Note that the first price and the second price do not have to be linked and/or otherwise connected by any particular or official exchange rate, and may be entered individually and separately by the particular player. Duration selection 304 may enable the particular player to enter and/or select a duration for this particular listing (e.g., through one or more text fields or one or more dropdown menus). User interface 300 as depicted may further include graphical user interface elements such as, by way of non-limiting example, an action button 32 (which transmits and/or publishes the listing information that corresponds to the selections made by the particular player in user interface 300).

Listing component 116 may be configured to receive transmissions of information, including but not limited to listing information from presentation component 133 and/or a particular individual user interface 125. In some implementations, listing component 116 may be configured to effectuate the publication of received information, including but not limited to listing information from presentation component 133 and/or a particular individual user interface 125. For example, a particular listing may be published via one or more user interfaces to other players. Alternatively, and/or simultaneously, a particular listing may be published via one or more online sales platforms 113.

Online sales platform(s) 113 may be configured to provides services to players 123 and/or other users to buy and/or sell (virtual) items. Online sales platform 113 may be configured to publish listings of items for sale (e.g., for auction). In some implementations, a particular sales listing may be published for a limited duration. For example, an auction may have a limited duration. In some implementations, a particular online sales platform 113 may support an Application Programming Interface (API) for the publication of sales listings. In some implementations, one or more online sales platforms 113 may be external to gaming platform 103 and/or system 100. For example, in some implementations, online sales platforms 105 may include one or more of eBay™, Amazon™, Etsy™, and/or another platform that supports online sales transactions. In some implementations, publications of sales listings may be effectuated subsequent to a verification whether the selling user has ownership of the particular (virtual) item.

Presentation component 133 may be configured to receive player input (e.g., through user interfaces that have been presented to other players, and that include listing information). In some implementations, the received user input (from prospective buyers) may include a selection of either the first price or the second price as included in the presented listing information. Responsive to receiving player input that includes a selection of either the first price or the second price, presentation component 133 may be configured to present a (new and/or additional) user interface and/or (graphical) user interface elements (within a previously presented user interface) to a particular player (e.g., a prospective buyer) depicting and/or representing one or more sets of settlement options. For example, responsive to the selection of the first price, a first set of one or more settlement options may be presented that include at least the first currency. However, this first set of settlement options may include additional currencies. In some implementations, this first set of settlement options need not be limited to fiat currencies (but could, e.g., include Amazon Points). For example, assume the first price is listed in US dollars. In some cases, the first set of settlement options available to the prospective buyer may include US dollars, Canadian dollars, and Euros. In another example, for a first price listed in US dollars, the first set of settlement options available to the prospective buyer may include US dollars, Euros, Bitcoin, and Tether (USDT). In some implementations, the specific first set of settlement options available to the prospective buyer may depend on the different kinds of currencies currently owned by the prospective buyer. In some implementations, the specific first set of settlement options available to the prospective buyer may depend on the different kinds of currencies currently linked (e.g., through online wallets, linked bank accounts, and/or other linked financial accounts) by the prospective buyer. In some implementations, the specific first set of settlement options available to a player may be configurable by the player.

For example, responsive to the selection, by the prospective buyer, of the second price, a second set of one or more settlement options may be presented that include at least the second currency. However, this second set of settlement options may include additional currencies. In some implementations, this second set of settlement options need not be limited to decentralized currencies. For example, assume the second price is listed in Ether. In some cases, the second set of settlement options available to the prospective buyer may include Bitcoin and Ether. In another example, for a second price listed in Ether, the second set of settlement options available to the prospective buyer may include Bitcoin, Ether, XRP, Tether (USDT), and Euro. In some implementations, the specific second of set of settlement options available to the prospective buyer may depend on the different kinds of currencies currently owned by the prospective buyer. In some implementations, the specific second set of settlement options available to the prospective buyer may depend on the different kinds of currencies currently linked (e.g., through online wallets, linked bank accounts, and/or other linked financial accounts) by the prospective buyer. In some implementations, the available settlement options may depend on which particular decentralized currency is used to list the second price. By way of non-limiting example, for a second price in Ether, the second set of settlement options may include one or more ERC20 token coins. However, for a second price in XRP, no ERC20 token coins may be available as option. In some implementations, the specific second set of settlement options available to a player may be configurable by the player.

Presentation component 133 may be configured to receive player input (e.g., from a particular user interface (or from user interface elements) that has/have been presented to a prospective buyer). In some implementations, the received user input (from the prospective buyer) may represent a settlement option selected either the first set of settlement options or the second set of settlement options. Responsive to receiving player input that represents a selected settlement option, system 100 (e.g., through registry component 128, transaction component 134, and/or other components) may be configured to effectuate a transfer of a particular individual unique digital article from a first user (i.e., the selling user) to a second user (i.e., the prospective buyer).

Registry component 128 may be configured to generate sets of instructions for registry servers 111 (e.g., registry server 111a) and/or one or more permanent registries (e.g., blockchain 117a). In some implementations, registry component 128 may be configured to transfer the generated sets of instructions to registry servers 111 and/or one or more permanent registries. In some implementations, one or more of these instructions may instruct the formation of a smart contract and/or the recording of the smart contract on the one or more permanent registries (e.g., blockchain 117a). In some implementations, these instructions may instruct registry servers 111 to record and/or modify unique digital articles, assets, transactions, and/or rights on one or more permanent registries. For example, registry component 128 may transfer a particular set of instructions that, upon execution by blockchain 117a and blockchain 117b, transfer (ownership of) a particular unique digital article from a first user to a second user. In some implementations, operations by registry component 128 may be responsive to certain events, actions, determinations, and/or other occurrences in other components (including, by way of non-limiting example, presentation component 133) or in one or more user interfaces 125.

Figure 4:
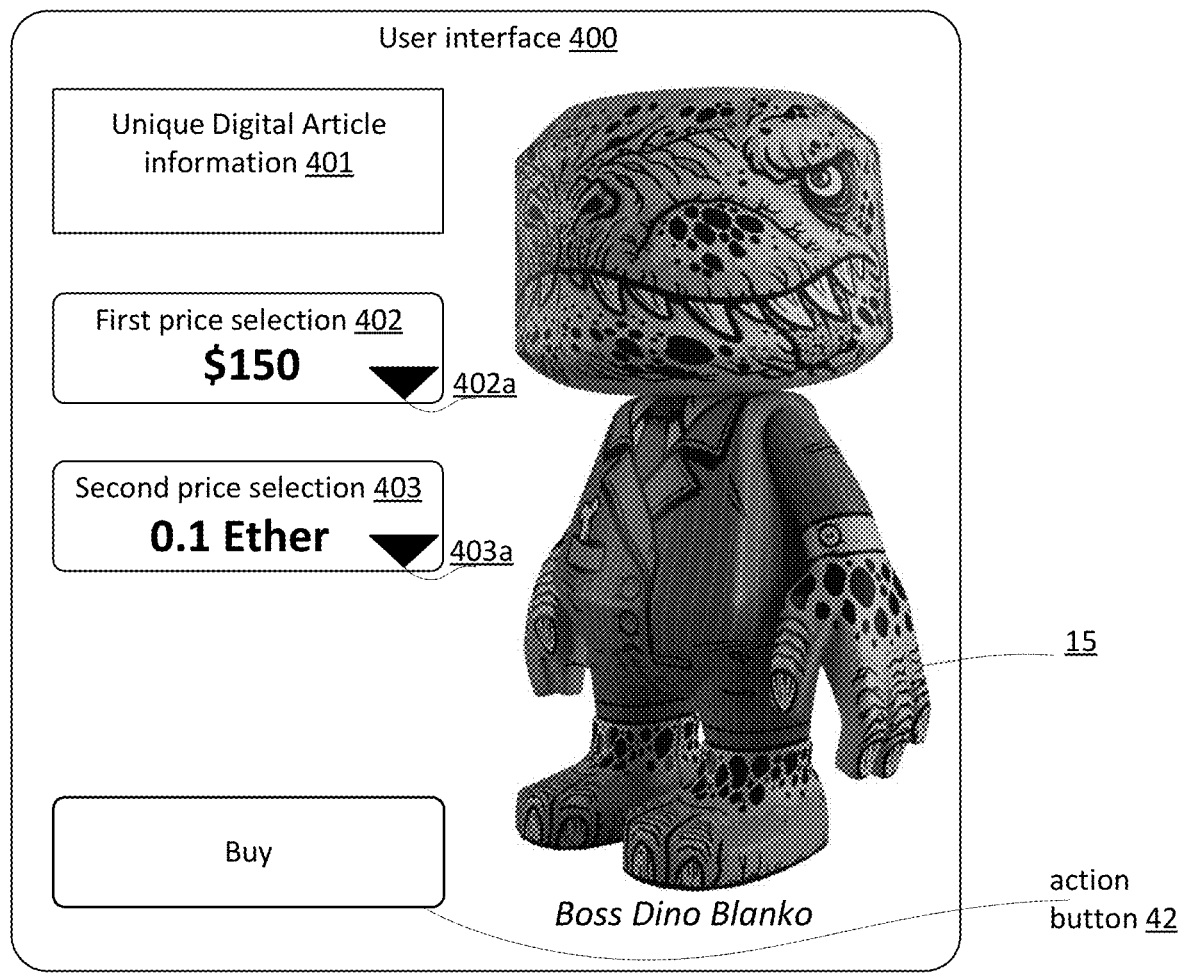

FIG. 4 illustrates an example implementation of a user interface 400 as may be used by system 100, in accordance with one or more implementations. User interface 400 may present listing information to a particular player (e.g., a prospective buyer). User interface 400 may enable the particular player to provide input, e.g., to select either the first price or the second price. The particular user may only select one of the available prices that have been listed. User interface 400 may include sections or fields for unique digital article information 401, first price selection 402, second price selection 403, and/or other graphical user interface elements. Unique digital article information 401 may provide listing information about a particular unique digital article for sale. Here, as depicted, the particular unique digital article 15 is labeled "Boss Dino Blanko". First price selection 402 may enable the particular player to select the first price (to buy the particular unique digital article). Here, as depicted, the first price is $150 US dollar. Additionally, settlement selection element 402a may enable the particular player to select from a first set of settlement options that include at least the first currency (e.g., through one or more text fields or one or more dropdown menus or other graphical user interface elements). Second price selection 403 may enable the particular player to select the second price (to buy the particular unique digital article). Here, as depicted, the second price is 0.1 Ether. Additionally, settlement selection element 403a may enable the particular player to select from a second set of settlement options that include at least the second currency (e.g., through one or more text fields or one or more dropdown menus or other graphical user interface elements). User interface 400 as depicted may further include graphical user interface elements such as, by way of non-limiting example, an action button 42 (which initiates and/or confirms the purchase of the particular unique digital article).

Registry-analysis component 120 may be configured to determine whether one or more unique digital articles are recorded on a particular permanent registry. In some implementations, registry-analysis component 120 may be configured to determine whether one or more unique digital articles are recorded as being owned by one or more particular players and/or accounts. For example, registry-analysis component 120 may determine whether a first unique digital article is currently recorded on a private permissioned permanent registry. In some implementations, registry-analysis component 120 may be configured to analyze recordations and other transactions on one or more permanent registries, e.g., by retrieving recorded information from the one or more permanent registries and analyzing whether any of the recorded transactions pertain to a particular unique digital article, or a set of unique digital articles. In some implementations, determinations by registry-analysis component 120 may be performed responsive to particular actions or results from other components of system 100, including but not limited to listing component 116. In some implementations, registry-analysis component 120 may be configured to determine whether ownership of a particular unique digital article (or other digital resource that is not fungible) has ever been recorded on a public permanent registry. For example, actions by other components of system 100, including but not limited to distribution component 124, may be responsive to determinations by registry-analysis component 120. In some implementations, a unique digital article may only be transferred from a first player to a second player if the first player is the registered owner of the unique digital article.

Notification component 122 may be configured to notify players. For example, notification component 122 may notify players in response to action requests, reward requests, and/or other requests. In some implementations, a player may be notified responsive to a requested manner of usage of a particular unique digital article (as requested through an action request) not being permitted or performed. In some implementations, actions by notification component 122 may be performed responsive to particular actions, results, determinations, or decisions from other components of system 100, including but not limited to listing component 116 and/or registry-analysis component 120. For example, notification component 122 may respond to a particular action request (by a particular player, and pertaining to a particular unique digital article) with a particular response such that, responsive to the particular manner of usage, as requested in the particular action request, being grouped under a particular type of unique digital article usage, and further responsive to determining the particular permanent registry on which the particular unique digital article has been recorded is a public permanent registry, the particular response notifies the particular player that the particular player is not permitted to use the particular unique digital article according to the particular action request. For example, players may be notified if a reward has been adjusted and/or modified, or could have been adjusted and/or modified.

Reward component 131 may be configured to determine eligibility for unique digital articles, other digital resources that are not fungible, and/or players 123 to receive one or more of information, access to in-game content, access to game-specific communication channels, certificates, (participation) rewards, (attendance) awards, prizes, distribution gains, and/or virtual items. In some implementations, reward component 131 may be configured to receive reward requests to provide one or more of information, access to in-game content, access to game-specific communication channels, certificates, rewards, awards, prizes, distribution gains, and/or virtual items to players 123 and/or particular unique digital articles. In some implementations, these types of determinations or (reward) requests may be based on and/or responsive to actions by other components of system 100, including but not limited to registry-analysis component 120. In some implementations, online gaming platform 105 may determine a particular player is eligible to receive one or more rewards or awards. In some implementations, online gaming platform 105 may provide reward requests for one or more rewards or awards. For example, responsive to a player accomplishing a predetermined milestone in the instance of the game, a reward request may be provided to reward component 131, e.g., by online gaming platform 105. Distributions in accordance with the determined eligibility may be made by distribution component 124. In some implementations, (one or more elements of) such eligible distributions may be adjusted and/or modified by adjustment component 126 prior to being distributed.

Distribution component 124 may be configured to distribute and/or otherwise provide one or more of information, access to in-game content, access to game-specific communication channels, certificates, rewards, awards, prizes, distribution gains, and/or virtual items to players 123. Distributions by distribution component 124 may be adjusted, e.g., by adjustment component 126. In some implementations, distributions may be responsive to (eligibility) determinations by reward component 131. In some implementations, distributions may be based on and/or responsive to actions by other components of system 100, including but not limited to registry-analysis component 120. For example, online gaming platform 105 may determine a particular player is eligible to receive one or more rewards or awards. Distribution component 124 may distribute the one or more rewards or awards in accordance with the determined eligibility. For example, a reward may be a participation reward. For example, an award may be an attendance award. For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive distribution gains in accordance with those distribution rights. For example, distribution gains may result from a particular action or activity (such as, e.g., a sale of a particular digital resource), e.g., within the online gaming platform 105, involving the particular digital resource.

Adjustment component 126 may be configured to adjust and/or modify distributions, including (planned or expected) distributions by distribution component 124. In some implementations, adjustment component 126 may adjust and/or modify one or more certificates, rewards, awards, prizes, distribution gains, and/or virtual items that have been determined by reward component 131 (also referred to as the determined distribution or the eligible distribution). Upon such adjustment and/or modification, this determined distribution (or eligible distribution) may be referred to as the adjusted distribution.

In some implementations, the eligible distribution (i.e., the one or more particular rewards, as determined by, e.g., reward component 131) may be adjusted and/or modified. As used here, increasing and decreasing rewards may be comparative to the eligible distribution. In some implementations, adjustment component 126 may be configured to adjust and/or modify one or more particular rewards, e.g., based on a function. In some implementations, an administrative user may enter and/or select user input that represents such a function (e.g., through a user interface presented through administration server 115). In some implementations, an administrative user may enter and/or select user input that represents how operations by reward component 131, adjustment component 126, distribution component 124, and/or other components of system 100 should be performed (e.g., through a user interface presented through administration server 115).

Distribution component 124 may distribute the (adjusted) distribution. In some implementations, adjustments and/or modifications by adjustment component 126 may increase the value of one or more elements of the eligible distribution (this may provide a positive incentive to players). Alternatively, and/or simultaneously, adjustments and/or modifications by adjustment component 126 may decrease the value of one or more elements of the eligible distribution (this may provide a negative incentive). In some implementations, actions by adjustment component 126 may be performed responsive to particular actions or results from other components of system 100, including but not limited to registry-analysis component 120.

Receipt component 136 may be configured to receive (sets of) instructions to add, modify, and/or remove recorded rights in blockchain 117a. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API function calls may be implemented as function calls to smart contracts stored on blockchain 117a. In some implementations, receipt component 136 may be arranged, organized, and/or otherwise included in registry server 111 and/or blockchain 117a.

Transaction component 134 may be configured to record (ownership) rights pertaining to digital resources, e.g., on blockchain 117a. In some implementations, transaction component 134 may record rights on electronic storage 130b. In some implementations, transaction component 134 may record rights on blockchain 117a. The rights may include ownership rights, distribution rights, and/or other rights. For example, particular recorded rights may reflect ownership of a particular digital resource by a particular player or group of players. For example, the particular digital resource may be not fungible, and may represent a three-dimensional in-game player-controllable item or character that can interact with other virtual items within online gaming platform 105. Recorded rights may be article-specific (i.e., specific to a unique digital article). Recorded rights may be asset-specific. For example, distribution rights for a particular digital resource may designate rights to certain distributions of benefits upon a specifically defined in-game action (e.g., an exchange between players) involving the particular digital resource.

In some implementations, transaction component 134 may be configured to record rights in blockchain 117a. In some implementations, transaction component 134 may add, modify, and/or remove recorded rights. For example, in accordance with received instructions from receipt component 136, transaction component 134 may transfer ownership of a particular digital resource from a first owner to a second owner (e.g., from an original owner to a new owner, or from a loser of a challenge to a winner of the challenge) such that the recorded rights on blockchain 117a no longer reflect the ownership of the particular digital resource by the first player. In some implementations, in accordance with received instructions, transaction component 134 may transfer ownership of a particular digital resource temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer ownership of a particular digital resource non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain asset-specific rights (e.g., ownership rights, distribution rights, and/or other rights) for particular digital resources. In some implementations, transaction component 134 may be configured to access blockchain 117a to obtain the asset-specific rights (that are recorded on blockchain 117a, e.g., in one or more smart contracts).

Input component 135 may be configured to receive user input from administrative users. For example, the user input may include entry and/or selection of particular information, unique digital articles, virtual items, and/or any entity or object that interacts with any part of system 100 and/or plays a part in the operation of system 100. For example, an administrative user may select a particular set of unique digital articles (e.g., all "Dazzle Blankos" that have been issued) as the input set of unique digital articles for other components of system 100. Additionally, the administrative user may select a particular adjustment to be enacted by adjustment component 126 (e.g., increase the value of one or more elements of the eligible distribution) for one or more types of determinations by reward component 131 (e.g., an eligible distribution of a reward of 100 virtual coins for leveling up a unique digital article in the selected set of unique digital articles, provided that the particular unique digital article is currently recorded on the private permissioned permanent registry, as determined by registry-analysis component 120). Based on these inputs and/or selections by the administrative user, system 100 may provide a blockchain-specific utility for (a set of) unique digital articles that incentivizes recording these unique digital articles on a specific permanent registry.

As another example, the administrative user may select a different set of unique digital articles (e.g., all "Boss Dino Blankos" that have been issued) as the input set of unique digital articles for other components of system 100. Additionally, the administrative user may select a particular adjustment to be enacted by adjustment component 126 (e.g., decrease the value of one or more elements of the eligible distribution) for one or more types of determinations by reward component 131 (e.g., an eligible distribution may be receiving the distribution gains based on particular in-game actions for unique digital articles in the selected set of unique digital articles, provided that the particular unique digital article is currently recorded on the public permanent registry, as determined by registry-analysis component 120). Based on these inputs and/or selections by the administrative user, system 100 may provide a blockchain-specific utility for (a selected set of) unique digital articles that incentivizes recording these unique digital articles on the private permissioned permanent registry.

Communication component 137 may be configured to facilitate communication and/or interaction between administration server 115 and the rest of system 100. For example, communication component 137 may communicate user input received by input component 135 to other components of system 100, particularly of online gaming platform 105.

Figure 6A:
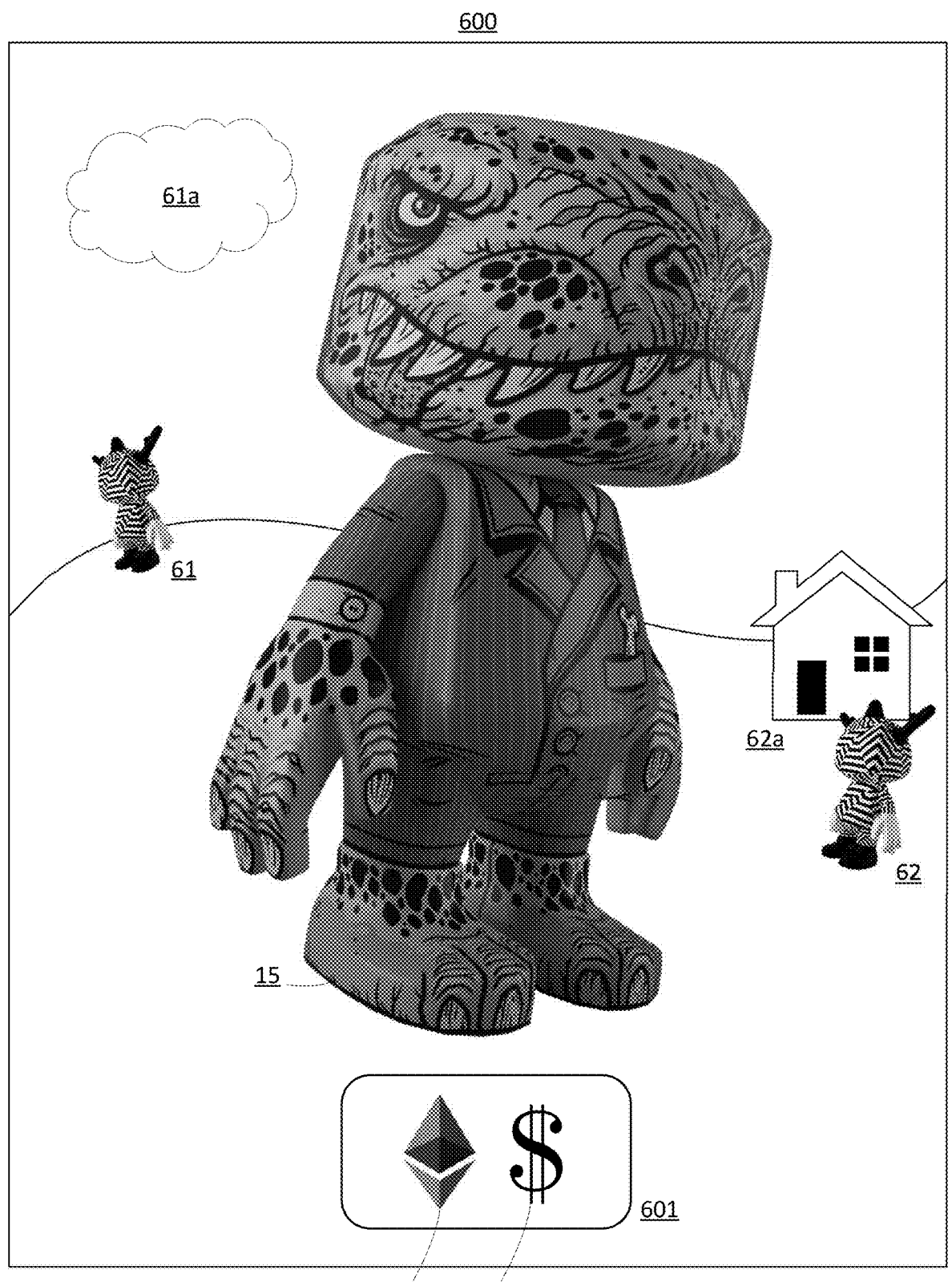
FIGS. 6A-6B illustrates exemplary views of interactive gameplay in an instance of a game, as may be used by a system configured to provide user interfaces to players of an online gaming platform, in accordance with one or more implementations.

In some implementations, game component 108 may be configured to (dynamically) modify depictions of player-controllable characters in instances of games. For example, game component 108 may add or modify the depiction of a particular in-game player-controllable character by one or more visual indicators. For example, a particular visual indicator may represent, to other players, that the particular in-game player-controllable character is for sale, or that listing information pertaining to the particular in-game player-controllable character has been published, e.g., on one or more online sales platforms 113. By way of non-limiting example, FIG. 6A depicts a view 600 of interactive gameplay by a particular player, using unique digital article 15 (depicted as a particular in-game player-controllable character referred to as "Boss Dino Blanko"). Other players may be active and present in view 600 (depicting a topography of a simulated space included in the instance of a game), for example a first player-controllable character 61 (standing below a cloud 61a) and a second player-controllable character 62 (standing near an in-game structure 62a that looks like a house). Here, a visual indicator 601 has been added to view 600 (visible at least to other players, and optionally visible to the particular player as well), representing that unique digital article 15 is for sale, and that prices are listed in the currencies indicated by a visual indicator 601a and a visual indicator 601b, corresponding to Ether and US dollars, respectively.

Figure 6B:
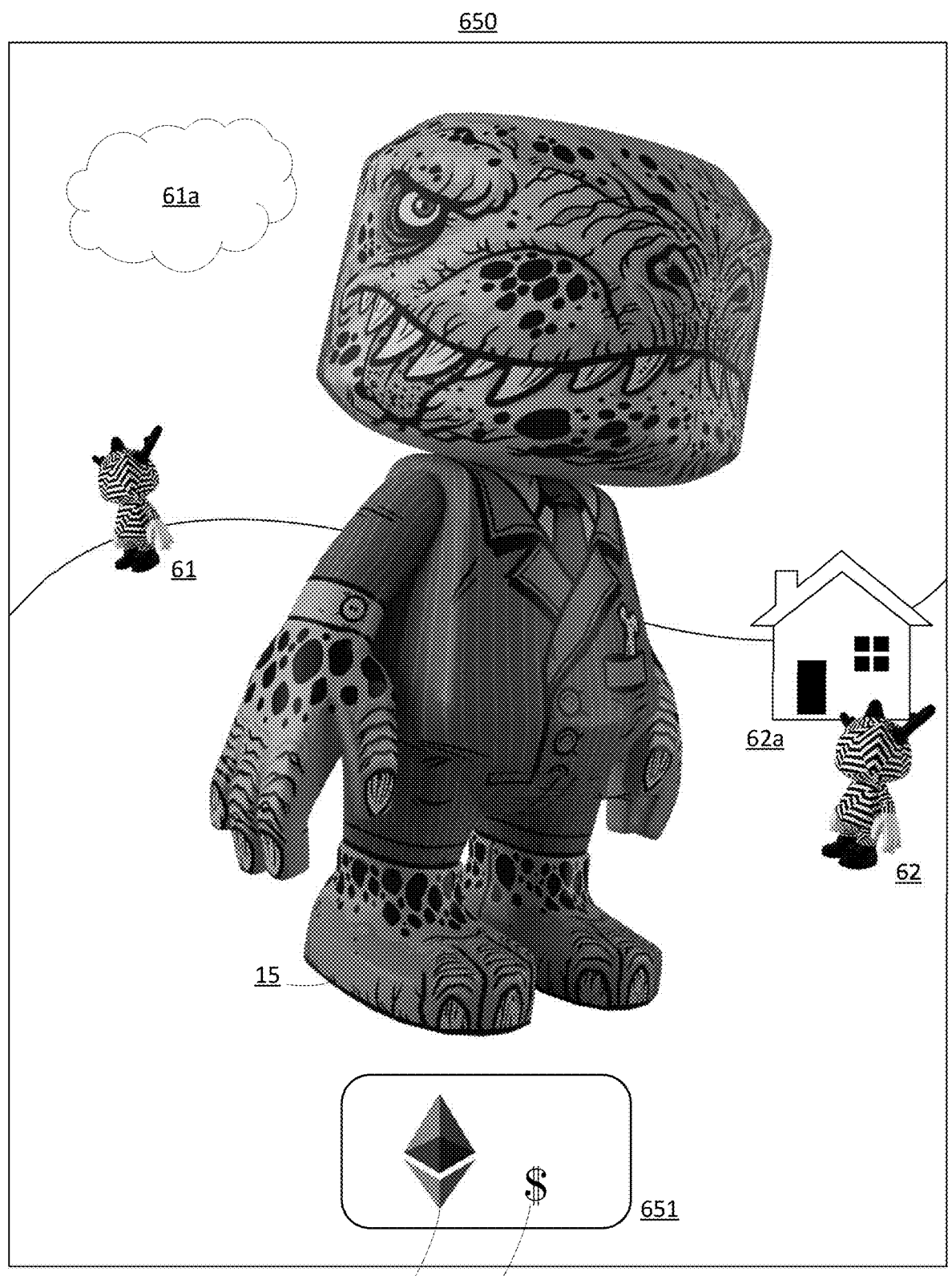

In some implementations, game component 108 may be configured to (dynamically) modify depictions of one or more visual indicators for a particular player-controllable character in instances of games, to represent whether a particular listed price is undervalued or overvalued compared to other listed prices (according to one or more established exchange rates between different currencies). By way of non-limiting example, FIG. 6B depicts a view 650 of interactive gameplay by a particular player, using unique digital article 15 (depicted as a particular in-game player-controllable character referred to as "Boss Dino Blanko"). Other players may be active and present in view 650, for example a first player-controllable character 61 and a second player-controllable character 62. Here, a visual indicator 651 has been added to view 650 (visible at least to other players), representing that unique digital article 15 is for sale, and that prices are listed in the currencies indicated by a visual indicator 651a and a visual indicator 651b, corresponding to Ether and US dollars, respectively. Additionally, the relative sizes of visual indicator 651a and visual indicator 651b may reflect that the currently listed price in Ether is lower (according to one or more established exchange rates between different currencies) than the currently listed price in US dollars, since visual indicator 651a is more prominently shown. For example, if Ether costs $1500, a price of $150 would match exactly a price of 0.1 Ether (assuming other fees such as transaction fees or profit sharing are equal). However, if the price of Ether has dropped to $1000, the listed price in Ether would be a better deal for a buyer than the listed price in US dollars. Conversely, if the price of Ether has increased to $2000, the listed price in US dollars would be a better deal for a buyer than the listed price in Ether (and in such a case, the relative sizes of visual indicator 651a and visual indicator 651b may be modified to dynamically reflect such a change in the exchange rate between US dollars and Ether). Other distinctions and/or differences between different visual indicators (besides relative size) are considered within the scope of this disclosure, including but not limited to the use of colors, blinking, outlining the character, and/or other visual and/or textual indicators that can be provided to other players. In some implementations, sellers may be able to configure the particular indicators (or modifications to indicators) to be used to signal a difference in multiple listed prices (according to one or more established exchange rates between different currencies) for the same unique digital article. Alternatively, and/or simultaneously, in some implementations, other players (e.g., prospective buyers) may be able to configure the particular indicators (or modifications to indicators) to be used to signal a difference in multiple listed prices (according to one or more established exchange rates between different currencies) for the same unique digital article.

Referring to FIG. 1, user interfaces 125 may be configured to facilitate interaction between players 123 and system 100 and/or between players 123 and client computing platforms 104. For example, user interfaces 125 may provide an interface (e.g., a challenge interface) through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Figure 5A:
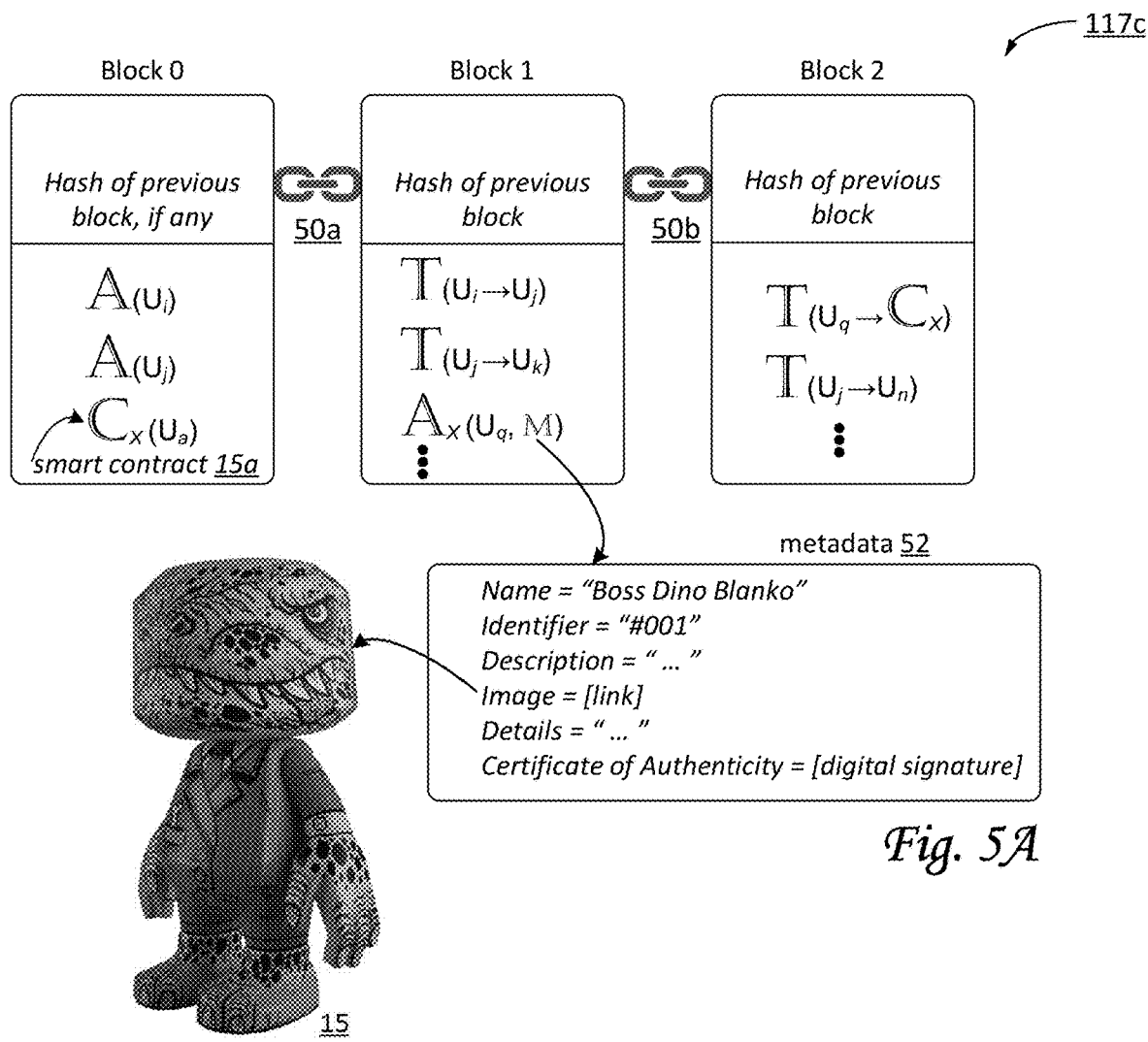
FIGS. 5A-5B illustrates exemplary blockchains, as may be used by a system configured to provide user interfaces to players of an online gaming platform, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, three assets (indicated by a capital "A") are generated and/or assigned to three players or participants: a first digital asset is assigned to player "i" ($U_i$), a second digital asset is assigned to player "j" ($U_j$), and a third digital asset, smart contract 15a, is assigned to player "a" ($U_a$). For example, smart contract 15a may be (or include) a template for issuing a particular type of unique digital article. Smart contract 15a may have been posted to blockchain 117c by a component similar to record component 134. For example, the assets in block 0 may be individual ownership rights recorded for particular digital assets within an online gaming platform. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15a (indicated by "Ax") is recorded, as well as a transaction from player "i" to player "j", and another transaction from player "j" to player "k". Transaction Ax to smart contract 15a may issue a unique digital article to player "q", the unique digital article being defined by metadata 52 (here, including a unique digital article named "Dino Boss Blanko", having identifier "#001", as depicted by a linked image of unique digital article 15, as well as including various other fields of information). In block 2, several transactions may be recorded: a transaction from player "j" to player "n", and a transaction from player "q" to smart contract 15a. For example, this transaction may represent player "q" using the particular unique digital article with identifier "#001" in some manner (which may or may not lead to a reward for this player). This unique digital article 15 may be part of a set of unique digital articles (that are all issued by smart contract 15a, e.g., all "Boss Dino Blankos"). Assume a blockchain 117d is the continuation of blockchain 117c. Player "q" may be eligible for a reward (e.g., based on the transaction in block 2, or based on activity by this player in the instance of the game). In some cases, this reward may be adjusted (e.g., decreased in value) or eliminated, due to a determination by, e.g., adjustment component 126.

Figure 5B:
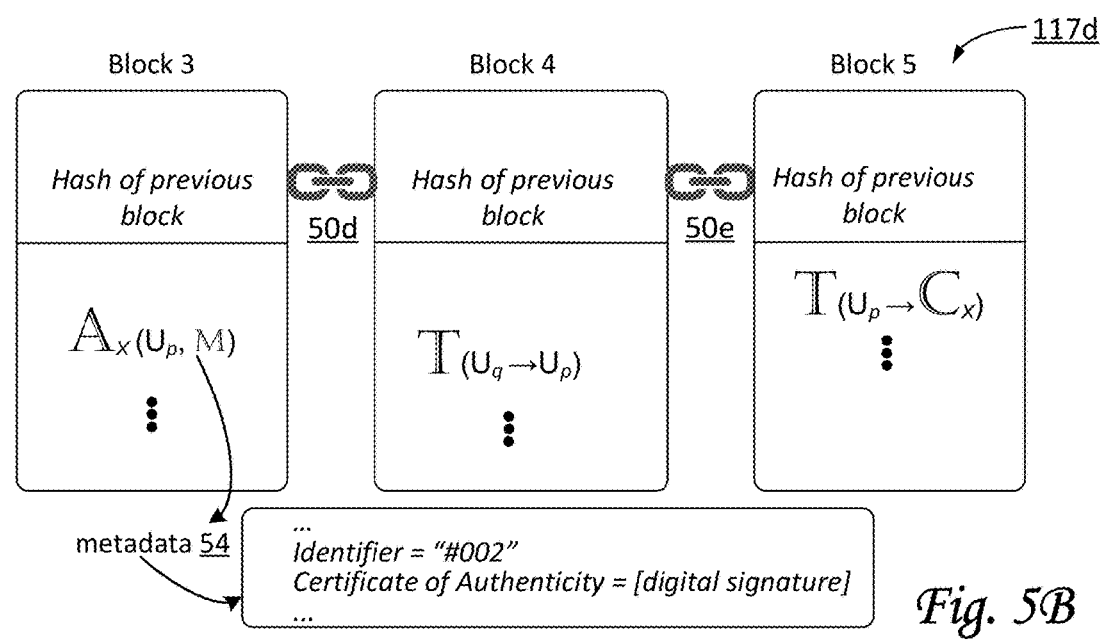

By way of non-limiting example, FIG. 5B illustrates blockchain 117d that includes several blocks (block 3, block 4, block 5). Block 3 may be connected to block 2 of blockchain 117c. Block 4 may be connected to block 3 (as indicated by a link 50d), and block 5 may be connected to block 4 (as indicated by a link 50e). In block 3, another transaction to smart contract 15a (indicated by "Ax") is recorded, which issues a unique digital article to player "p", the unique digital article being defined by metadata 54, and having identifier "#002". Block 4 includes a transaction (indicated by a capital "T") from player "q" to player "p". For example, the transaction may represent a purchase of unique digital article 15 by buyer player "p" from seller player "q", using the various user interfaces as described in this disclosure, such that buyer player "p" can select between a first price and a second price (and, in some implementations, select a particular settlement option from a set of settlement options related to the selected price). Block 5 includes a transaction from player "p" to smart contract 15a. For example, this transaction may represent player "p" using the particular unique digital article with identifier "#001" in some manner, which may lead to a reward for player "p".

Referring to FIG. 1, in some implementations, online gaming platforms 105, server(s) 102, client computing platform(s) 104, administration servers 115, registry servers 111, online sales platforms 113, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with one or more networks 13 and/or other computing platforms. In some implementations, administration servers 115 may be used by one or more administrative users, e.g., to configure and/or control operation of system 100. In some implementations, administrative servers 115 may include or use one or more user interfaces to receive user input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, external resources 138 may include one or more blockchain oracles (as may be used to determine results for decisions, challenges, and/or other determinations based on real-world information).

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 120, 122, 124, 126, 128, 131, 133, 134, 135, 136, and/or 137, and/or other components. Processor(s) 132 may be configured to execute components 108, 110, 112, 114, 116, 120, 122, 124, 126, 128, 131, 133, 134, 135, 136, and/or 137, and/or other components by software; hardware; firmware; some combination of software, hardware, and/or firmware; and/or other mechanisms for configuring processing capabilities on processor(s) 132.

As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 120, 122, 124, 126, 128, 131, 133, 134, 135, 136, and/or 137 are illustrated in FIG. 1 as being implemented within a single processing unit, in implementations in which processor(s) 132 includes multiple processing units, one or more of components 108, 110, 112, 114, 116, 120, 122, 124, 126, 128, 131, 133, 134, 135, 136, and/or 137 may be implemented remotely from the other components. The description of the functionality provided by the different components 108, 110, 112, 114, 116, 120, 122, 124, 126, 128, 131, 133, 134, 135, 136, and/or 137 described below is for illustrative purposes, and is not intended to be limiting, as any of components 108, 110, 112, 114, 116, 120, 122, 124, 126, 128, 131, 133, 134, 135, 136, and/or 137 may provide more or less functionality than is described. For example, one or more of components 108, 110, 112, 114, 116, 120, 122, 124, 126, 128, 131, 133, 134, 135, 136, and/or 137 may be eliminated, and some or all of its functionality may be provided by other ones of components 108, 110, 112, 114, 116, 120, 122, 124, 126, 128, 131, 133, 134, 135, 136, and/or 137. As another example, processor(s) 132 may be configured to execute one or more additional components that may perform some or all of the functionality attributed below to one of components 108, 110, 112, 114, 116, 120, 122, 124, 126, 128, 131, 133, 134, 135, 136, and/or 137.

Figure 2:
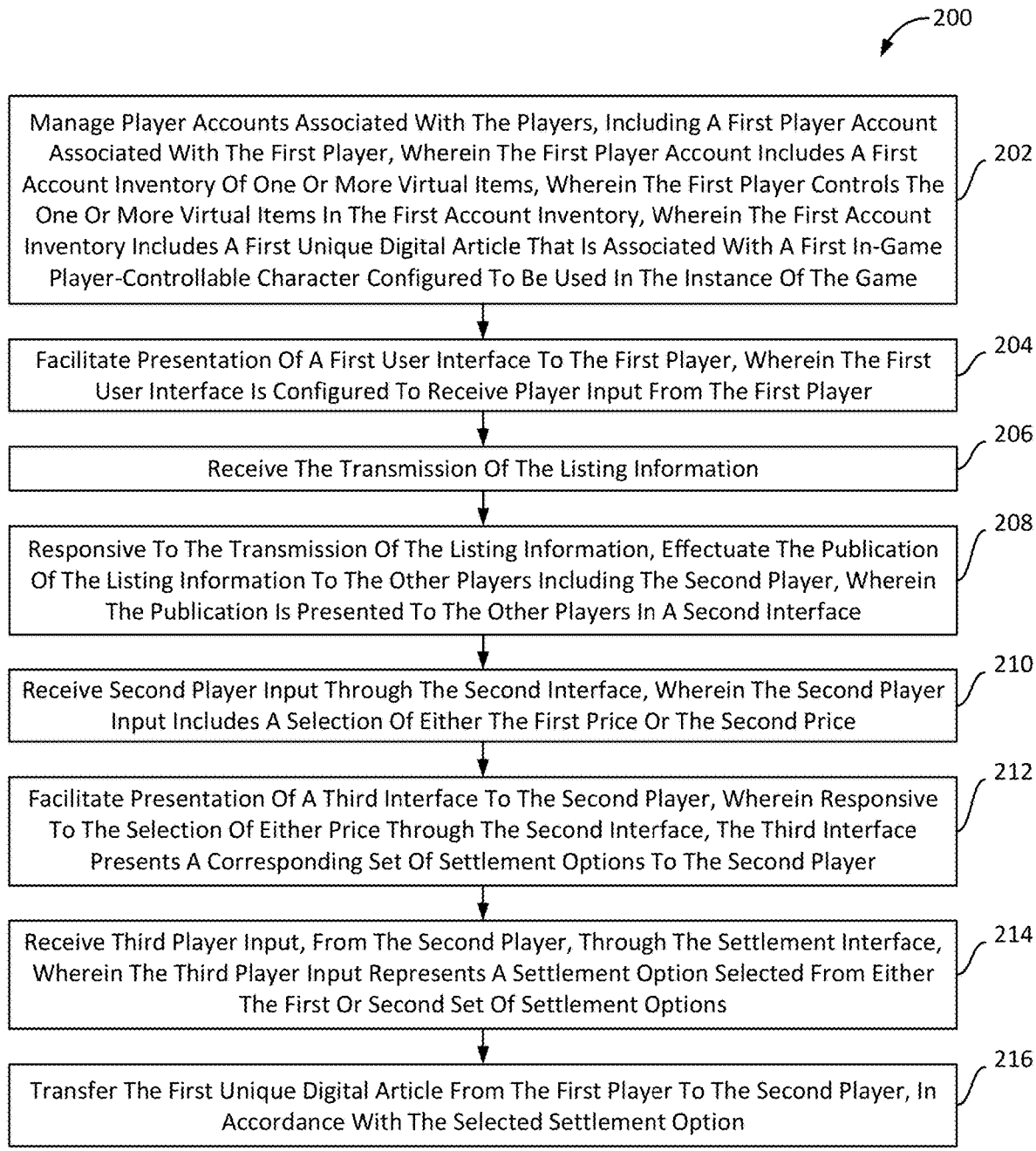
FIG. 2 illustrates a method of providing user interfaces to players of an online gaming platform, in accordance with one or more implementations.

FIG. 2 illustrates a method 200 to provide user interfaces to players of an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, player accounts are managed that are associated with the players. The player accounts include a first player account associated with the first player. The first player account includes a first account inventory of one or more virtual items. The first player controls the one or more virtual items in the first account inventory. The first account inventory includes a first unique digital article that is associated with a first in-game player-controllable character configured to be used in the instance of the game. In some embodiments, operation 202 is performed by an account component the same as or similar to account component 112 (shown in FIG. 1 and described herein).

At an operation 204, presentation of a first user interface to the first player is facilitated. The first user interface is configured to receive player input from the first player. The first user interface enables, through the player input, the player to (i) enter and/or select the first unique digital article that is included in the first account inventory, (ii) enter and/or select a first price listed in a first currency, wherein the first currency is a fiat currency, (iii) enter a second price listed in a second currency different from the first currency, wherein the second currency is a decentralized currency, and (iv) initiate transmission of a listing information for publication to other players including the second player. The listing information corresponds to the player input received from the first player through the first user interface. The listing information presents the first unique digital article for sale at either the first price or the second price. In some embodiments, operation 204 is performed by a presentation component the same as or similar to presentation component 133 (shown in FIG. 1 and described herein).

At an operation 206, the transmission of the listing information is received. In some embodiments, operation 206 is performed by a listing component and/or an online sales platform the same as or similar to listing component 116 and/or online sales platform 113 (shown in FIG. 1 and described herein).

At an operation 208, responsive to receiving the transmission of the listing information, the publication of the listing information to the other players is effectuated, including to the second player. The publication is presented to the other players in a second interface. In some embodiments, operation 208 is performed by a listing component and/or an online sales platform the same as or similar to listing component 116 and/or online sales platform 113 (shown in FIG. 1 and described herein).

At an operation 210, second player input is received, from the second player, through the second interface. The second player input includes a selection of either the first price or the second price. In some embodiments, operation 210 is performed by a presentation component the same as or similar to presentation component 133 (shown in FIG. 1 and described herein).

At an operation 212, presentation of a third interface to the second player is facilitated. Responsive to the selection, by the second player, of the first price through the second interface, the third interface presents a first set of one or more settlement options to the second player. The first set includes the first currency, Responsive to the selection of the second price through the second interface, the third interface presents a second set of one or more settlement options to the second player. The second set includes the second currency. In some embodiments, operation 212 is performed by a presentation component the same as or similar to presentation component 133 (shown in FIG. 1 and described herein).

At an operation 214, third player input is received, from the second player, through the third interface. The third player input represents a settlement option selected from either the first or second set of settlement options. In some embodiments, operation 214 is performed by a presentation component the same as or similar to presentation component 133 (shown in FIG. 1 and described herein).

At an operation 216, the first unique digital article is transferred from the first player to the second player, in accordance with the selected settlement option. In some embodiments, operation 216 is performed by a registry component and/or transaction component the same as or similar to registry component 128 and/or transaction component 134 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to provide user interfaces and relative price information to players of an online gaming platform, wherein the online gaming platform is configured to execute an instance of a game to facilitate presentation of the game to the players, wherein the presentation of the game is based on views of the game that are determined during execution of the instance of the game, wherein the players include a first player and a second player, the system comprising:
   one or more processors configured by machine-readable instructions to:
      manage player accounts associated with the players, wherein the player accounts include a first player account associated with the first player, wherein the first player account includes a first account inventory of one or more virtual items, wherein the first player controls the one or more virtual items in the first account inventory, wherein the first account inventory includes a first unique digital article that is associated with a first in-game player-controllable character configured to be used in the instance of the game;
      facilitate presentation of a first user interface to the first player, wherein the first user interface is configured to receive player input from the first player, wherein the first user interface enables, through the player input, the player to:
         (i) enter and/or select the first unique digital article that is included in the first account inventory,
         (ii) enter and/or select a first price in a first currency, wherein the first currency is a fiat currency,
         (iii) enter a second price in a second currency different from the first currency, wherein the second currency is a decentralized currency,
         (iv) initiate transmission of listing information for publication to other players including the second player, wherein the listing information corresponds to the player input received from the first player through the first user interface, and wherein the listing information presents the first unique digital article for sale at either the first price or the second price;
      receive the transmission of the listing information;
      responsive to receipt of the transmission of the listing information, effectuate the publication of the listing information to the other players including the second player, wherein the publication is presented to the other players in a second interface that is different from the first user interface;
      effectuate a game presentation of the game to the second player, via a second client computing platform associated with the second player, wherein the game presentation includes the first in-game player-controllable character;

responsive to receipt of the transmission of the listing information, modify a depiction of the first in-game player-controllable character in the game presentation by a visual indicator, wherein the visual indicator visually represents, to the second player, the publication of the listing information pertaining to the first unique digital article that is correlated to the first in-game player-controllable character, wherein the visual indicator has a first type or a second type, wherein the first type is visually distinct from the second type, wherein the first type of visual indicator indicates the first price is valued below the second price based on a current exchange rate between the first currency and the second currency, and wherein the second type of visual indicator indicates the second price is valued below the first price based on the current exchange rate between the first currency and the second currency;

receive second player input, from the second player, through the second interface, wherein the second player input includes a selection of either the first price or the second price;

facilitate presentation of a third interface to the second player, wherein the third user interface is different from both the first user interface and the second interface, wherein:
(i) responsive to the selection of the first price through the second interface, the third interface presents a first set of one or more settlement options to the second player, wherein the first set includes the first currency,
(ii) responsive to the selection of the second price through the second interface, the third interface presents a second set of one or more settlement options to the second player, wherein the second set includes the second currency;

receive third player input, from the second player, through the third interface, wherein the third player input represents a settlement option selected from either the first or second set of settlement options; and transfer the first unique digital article from the first player to the second player, in accordance with the selected settlement option.

2. The system of claim 1, wherein the one or more processors are further configured to:
execute the instance of the game to facilitate the presentation of the game to the players, and implement in-game actions in the instance of the game in response to action requests for the in-game actions by the players, wherein the presentation of the game is based on the views of the game that are determined during the execution of the instance of the game.

3. The system of claim 2, wherein the action requests for the in-game actions include a first action request by the first player for a first in-game action to be performed by the first in-game player-controllable character in the instance of the game, wherein the views of the game as presented to the first player, via a first client computing platform associated with the first player, depict the first in-game player-controllable character performing the first in-game action in accordance with the first action request by the first player.

4. The system of claim 3,
wherein the views of the game as presented to the second player, via the second client computing platform associated with the second player, depict a combination of the first in-game player-controllable character and the visual indicator.

5. The system of claim 4, wherein the visual indicator includes one or more of:
(i) an icon and/or textual information added on a surface of the first in-game player-controllable character,
(ii) the icon and/or the textual information added to a set of information items pertaining to the first in-game player-controllable character,
(iii) the icon and/or the textual information depicted in a peripheral field of an in-game user interface that presents the views of the game to the second player,
(iv) the icon, an effect, and/or the textual information added to the views of the game in proximity of the first in-game player-controllable character.

6. The system of claim 1, wherein the one or more processors are further configured to:
present the publication of the listing information to the second player, wherein the second interface is presented on the second client computing platform.

7. The system of claim 1, wherein the one or more processors are further configured to:
receive, through the second interface, from the second player, an offer to purchase the first unique digital article for either the first price or the second price.

8. The system of claim 1, wherein the visual indicator indicates the listing information includes both of the first price and the second price.

9. A method of providing user interfaces and relative price information to players of an online gaming platform, wherein the online gaming platform executes an instance of a game to facilitate presentation of the game to the players, wherein the presentation of the game is based on views of the game that are determined during execution of the instance of the game, wherein the players include a first player and a second player, the method comprising:
managing player accounts associated with the players, wherein the player accounts include a first player account associated with the first player, wherein the first player account includes a first account inventory of one or more virtual items, wherein the first player controls the one or more virtual items in the first account inventory, wherein the first account inventory includes a first unique digital article that is associated with a first in-game player-controllable character configured to be used in the instance of the game;

facilitating presentation of a first user interface to the first player, wherein the first user interface is configured to receive player input from the first player, wherein the first user interface enables, through the player input, the player to (i) enter and/or select the first unique digital article that is included in the first account inventory, (ii) enter and/or select a first price in a first currency, wherein the first currency is a fiat currency, (iii) enter a second price in a second currency different from the first currency, wherein the second currency is a decentralized currency, (iv) initiate transmission of a listing information for publication to other players including the second player, wherein the listing information corresponds to the player input received from the first player through the first user interface, and wherein the listing information presents the first unique digital article for sale at either the first price or the second price;

receiving the transmission of the listing information;
responsive to receiving the transmission of the listing information, effectuating the publication of the listing information to the other players including the second player, wherein the publication is presented to the other players in a second interface that is different from the first user interface;
effectuating a game presentation of the game to the second player, via a second client computing platform associated with the second player, wherein the game presentation includes the first in-game player-controllable character;
responsive to receipt of the transmission of the listing information, modifying a depiction of the first in-game player-controllable character in the game presentation by a visual indicator, wherein the visual indicator visually represents, to the second player, the publication of the listing information pertaining to the first unique digital article that is correlated to the first in-game player-controllable character, wherein the visual indicator has a first type or a second type, wherein the first type is visually distinct from the second type, wherein the first type of visual indicator indicates the first price is valued below the second price based on a current exchange rate between the first currency and the second currency, and wherein the second type of visual indicator indicates the second price is valued below the first price based on the current exchange rate between the first currency and the second currency;
receiving second player input, from the second player, through the second interface, wherein the second player input includes a selection of either the first price or the second price;
facilitating presentation of a third interface to the second player, wherein the third user interface is different from both the first user interface and the second interface, wherein:
  (i) responsive to the selection of the first price through the second interface, the third interface presents a first set of one or more settlement options to the second player, wherein the first set includes the first currency,
  (ii) responsive to the selection of the second price through the second interface, the third interface presents a second set of one or more settlement options to the second player, wherein the second set includes the second currency;
receiving third player input, from the second player, through the third interface, wherein the third player input represents a settlement option selected from either the first or second set of settlement options; and
transferring the first unique digital article from the first player to the second player, in accordance with the selected settlement option.

10. The method of claim 9, further comprising:
executing the instance of the game to facilitate the presentation of the game to the players, and implementing in-game actions in the instance of the game in response to action requests for the in-game actions by the players, wherein the presentation of the game is based on the views of the game that are determined during the execution of the instance of the game.

11. The method of claim 10, wherein the action requests for the in-game actions include a first action request by the first player for a first in-game action to be performed by the first in-game player-controllable character in the instance of the game, wherein the views of the game as presented to the first player, via a first client computing platform associated with the first player, depict the first in-game player-controllable character performing the first in-game action in accordance with the first action request by the first player.

12. The method of claim 11,
wherein the views of the game as presented to the second player, via the second client computing platform associated with the second player, depict a combination of the first in-game player-controllable character and the visual indicator.

13. The method of claim 12, wherein the visual indicator includes one or more of:
  (i) an icon and/or textual information added on a surface of the first in-game player-controllable character,
  (ii) the icon and/or the textual information added to a set of information items pertaining to the first in-game player-controllable character,
  (iii) the icon and/or the textual information depicted in a peripheral field of an in-game user interface that presents the views of the game to the second player,
  (iv) the icon, an effect, and/or the textual information added to the views of the game in proximity of the first in-game player-controllable character.

14. The method of claim 9, further comprising:
presenting the publication of the listing information to the second player, wherein the second interface is presented on the second client computing platform.

15. The method of claim 9, further comprising:
receiving, through the second interface, from the second player, an offer to purchase the first unique digital article for either the first price or the second price.

16. The method of claim 9, wherein the visual indicator indicates the listing information includes both of the first price and the second price.

* * * * *